United States Patent [19]

Sakai et al.

[11] Patent Number: 4,990,207

[45] Date of Patent: Feb. 5, 1991

[54] PROCESS FOR PREPARING FIBER-REINFORCED THERMOPLASTIC MOLDED ARTICLES

[75] Inventors: Hideo Sakai; Toshiyuki Nakakura; Satoru Kishi, all of Kanagawa, Japan

[73] Assignee: Mitsui Toatsu Chemicals, Inc., Tokyo, Japan

[21] Appl. No.: 351,533

[22] Filed: May 15, 1989

[30] Foreign Application Priority Data

Oct. 13, 1988 [JP] Japan .................................. 62-79715
Nov. 4, 1988 [JP] Japan .................................. 62-101805

[51] Int. Cl.$^5$ .............................................. B32B 31/18
[52] U.S. Cl. ...................................... 156/242; 156/245; 156/252; 156/253; 156/263
[58] Field of Search ................ 156/180, 252, 253, 263, 156/87, 242, 245, 257, 268

[56] References Cited

U.S. PATENT DOCUMENTS

| | | |
|---|---|---|
| 4,626,306 | 12/1986 | Chabrier et al. .................... 156/180 |
| 4,732,636 | 3/1988 | Varker ................................. 156/252 |
| 4,892,600 | 1/1990 | Beever ................................. 156/180 |

*Primary Examiner*—Caleb Weston
*Attorney, Agent, or Firm*—Burns, Doane, Swecker & Mathis

[57] ABSTRACT

This invention relates to a process for preparing fiber-reinforced thermoplastic (FRTP) molded articles comprising stacking sheet prepregs comprising unidirectionally arranged reinforcing fibers impregnated with thermoplastic resin and molding the same, and to a process for preparing FRTP molded articles by using woven reinforcing fibers in place of unidirectionally arranged reinforcing fibers. The FRTP molded articles obtained by the process of this invention have high quality and can be molded without unevenness in strength.

13 Claims, 3 Drawing Sheets

PROCESS FOR PREPARING FIBER-REINFORCED THERMOPLASTIC MOLDED ARTICLES

BACKGROUND OF THE INVENTION a. Field of the Invention

The present invention relates to a process for preparing molded articles of fiber-reinforced thermoplastics (hereinafter abbreviated as FRTP).

b. Description of the Prior Art

Conventionally known FRTP which contains a thermoplastic resin as a matrix material is reinforced with short fibers having a fiber length of no greater than 1 mm, or with continuous strands of mat.

FRTP which contains a thermoplastic resin as a matrix material and is reinforced with short fibers having a fiber length of no greater than 1 mm has good fiber flowability and hence is widely used for injection molding materials. The molded products have good appearance but poor strengths.

FRTP which contains thermoplastic resin as a matrix material and is reinforced with continuous strands of mat has poor fiber flowability and hence is used for stamp molding materials which are primarily used for molding almost flat forms. The molded forms have poor appearance and high strengths.

A new material having combined characteristics of the above two materials has recently been developed. The new material has good fiber flowability and provides both good appearance and high strength to the molded products. In processing the new material, strands or yarns are cut into a length of about 2.5 mm. The resulting chopped strands or chopped yarns are stacked to a desired shape and molded by below described press molding, autoclave molding or stamp molding.

However, FRTP containing the chopped strands or the chopped yarns inevitably generates non-uniform fiber flow or orientation of fiber, which leads to scattering of strengths and warpage or torsion of molded products. Thus, FRTP has many problems with respect to reliability when used for structural materials.

Chopped strand mats or chopped yarns useful for stamp molding have been disclosed. Woven textiles, however, cannot be applied to the reinforcing fiber in the stamp molding process. Woven textiles are different from chopped strands or chopped yarns and have almost no degree of freedom with respect to fiber flowability, and hence uniform filling of the mold is inhibited. When the shape of the molded products, i.e. the configuration of the cavity in the mold, is similar to a plate, stamp molding, press molding or autoclave molding can also be applied. However, in three-dimensional configurations such as curved surfaces, partial overlapping of the woven textiles during the molding process, thereby causing an excess of fiber and a decrease in strength in the overlapped portion.

SUMMARY OF THE INVENTION

The present invention overcomes the problems and disadvantages of the prior art by providing a process for preparing high quality fiber-reinforced thermoplastic molded articles.

It is an object of this invention to provide a process for preparing high quality molded articles of FRTP having good flowability during the molding operation, which inhibit short shot and are capable of eliminating warpage, torsion or scattering of strengths of the molded article due to non-uniform flow of the reinforcing fiber, even in the molding of complicated three-dimensional configurations.

Another object of this invention is to provide a process for preparing molded articles of FRTP having good flowability and which are capable of preventing overlap of woven textiles and decrease in strengths during molding of complicated three-dimensional configurations.

Additional objects and advantages of the invention will be set forth in part in the description which follows, and in part will be obvious from the description, or may be learned by practice of the invention. The objects and advantages of the invention will be realized and attained by means of the instrumentalities and combinations, particularly pointed out in the appended claims.

To achieve the objects and in accordance with the purpose of the invention as embodied and broadly described herein, the invention provides a process for preparing a fiber-reinforced thermoplastic article comprising stacking a plurality of sheet prepregs comprising unidirectionally arranged reinforcing fiber impregnated with a thermoplastic resin; applying to said prepregs at least one notch in a direction traversing the fiber said at least one notch having a depth sufficient to cut the fiber; and molding said prepreg to form a fiber-reinforced thermoplastic article. (This process will be referred to hereafter as "Process (1)")

The invention also provides a process for preparing fiber-reinforced thermoplastic articles comprising stacking a plurality of sheet prepregs comprising woven reinforcing fibers impregnated with a thermoplastic resin, applying to said prepreg at least one notch having a depth sufficient to cut said fiber in said prepreg providing that when said prepreg contains greater than one notch, said notches do not intersect each other. (This process will be referred to hereafter as "Process (2)")

The accompanying drawings, which are incorporated in and constitute a part of this specification, illustrate several exemplary embodiments of the invention and together with the description, serve to explain the principles of the invention.

BRIEF DESCRIPTION OF THE DRAWINGS

FIGS. 1(A) and 1(B) illustrate exemplary notch depths suitable for use in the process of this invention.

DESCRIPTION OF THE PREFERRED EMBODIMENTS

Reference will now be made in detail to the present preferred embodiments of the invention, examples of which are illustrated in the accompanying drawings.

Exemplary suitable thermoplastic resins suitable for use in the process of this invention includes polystyrene, polypropylene, polyethylene, AS resin, ABS resin, ASA resin (polyacrylonitrile-polystyrene-polyacrylate resin), polymethyl methacrylate, nylon, polyacetal, polycarbonate, polyethylene terephthalate, polybutylene terephthalate, polyphenylene oxide, fluoro resin, polyphenylene sulfide, polysulfone, polyether sulfone, polyether ketone, polyether ether ketone, polyimide and polyacrylate.

Exemplary reinforcing fiber suitable for use in the processes of the invention include glass fibvers, carbon fibers, aramid fibers and silicon carbide fibers. The fibers are generally prepared by unidirectionally arranging from about 100 to about 200 rovings per 100 to 200 mm width which are obtained by bundling from about 300 to about 12000 monofilaments having a diameter of from about 3 to about 13 $\mu$m.

Due to its flowability, a prepreg prepared from common continuous strands or chopped yarns may be employed in the present invention, only when the volume content of the reinforcing fiber is no greater than from about 30% to about 40% by volume. However, in accordance with the process (1) of this invention, the flowability of the fiber can be improved. Consequently, a prepreg that contains a reinforcing fiber in an amount of from about 55 to about 65% by volume may also be employed and molded articles of FRTP are expected to exhibit improved strengths.

The woven textile for use in process (2) of this invention can be obtained by weaving a yarn containing fibers selected from the group consisting of glass fibers, carbon fibers, aramid fibers and silicon carbide fibers.

The common yarn for use in the textile is prepared by bundling from about 200 to about 12000 monofilaments having a diameter of from about 3 to about 15 $\mu$m, i.e. a tex of approximately from about 16.8 to about 1000. The thread count both in the warp and the weft is generally from about 5 to 80 yarns per 25 mm width of the woven textile. Weaving includes plain weave, satin weave and diagonal weave.

When glass fibers are used for preparing the woven textile, the binding agent is removed by heat cleaning and the resultant textile is then treated with a coupling agent based on silane, titanate or zirconium.

Fibers other than glass fibers are often treated with epoxy base coupling agents.

When glass fibers are used for reinforcing the resin, a suitable coupling agent must be selected in accordance with the resin to be combined. Practical examples will be illustrated below.

Exemplary suitable coupling agents for nylon resins include $\gamma$-aminopropyl-trimethoxysilane and N-($\beta$-aminoethyl)-$\gamma$-aminopropyl-trimethoxysilane.

Exemplary suitable coupling agents for polycarbonate resins include $\gamma$-aminopropyl-trimethoxysilane and N-($\beta$-aminoethyl)-$\gamma$-aminopropyl-trimethoxysilane.

Exemplary suitable coupling agents for polyethylene terephthalate or polybutylene terephthalate include $\beta$-(3,4-epoxycyclohexyl)ethyl-trimethoxysilane, $\gamma$-glycidoxypropyl-trimethoxysilane and $\gamma$-aminopropyl-trimethoxysilane.

Exemplary suitable coupling agents for polyethylene or polypropylene include vinyltrimethoxysilane, vinyltris(2-methoxyethoxy)silane and $\gamma$-methacryloxypropyl-trimethoxysilane.

The above coupling agents can be used for polyphenylene oxide, polyphenylene sulfide, polysulfone, polyether sulfone, polyether ketone or fluoro resin. Other coupling agents such as N-($\beta$-aminoethyl)-$\gamma$-aminopropyl-methyldimethoxysilane, $\gamma$-chloropropyl-methyldimethoxysilane, $\gamma$-mercaptopropyl-trimethoxysilane and p-aminophenyl-triethoxysilane are also suitable for use in the process of the invention.

When fibers other than the glass fiber are used, the fibers are often treated with an amine curing type epoxy resin as a coupling agent. Exemplary epoxy resins suitable for use in the treatment include bisphenol-A-epoxy resins, epoxy-novolac resins, alicyclic epoxy resins, aliphatic epoxy resins, glycidyl ester type resins and brominated epoxy resins.

The coupling agents may be applied to the surface of the fiber by the following method:

The binding agent is removed from the fiber. The residual fiber is completely impregnated with a solution containing from about 0.1 to about 3% by weight of a coupling agent for example by dipping, spraying and coating.

The fiber impregnated with the coupling agent solution is dried at a temperature of from about 60° to about 120° C. to carry out reaction of the coupling agent with the surface of the fiber. The time required for complete evaporations of the solvent is sufficient for the reaction to occur and is approximately from about 15 to about 20 minutes.

The solvent for dissolving the coupling agent is selected in accordance with a surface treating agent to be employed. In some cases, water is used after adjusting the pH to a range of approximately from about 2.0 to about 12.0. In other cases, organic solvents such as ethanol, toluene and xylene are used singly or in combination.

Various methods may be employed for preparing a prepreg by impregnating a woven fiber or a unidirectionally arranged fiber with a thermoplastic resin. The most popular methods are described below.

One method that may be employed when the resin is soluble in the solvent is dissolving resin in the solvent, impregnating the fiber with the resultant resin solution, and removing the solvent with defoaming to obtain the prepreg.

In another method, the resin may be heated to produce a fused resin. The fiber is then impregnated with the fused resin, and then the applied resin is defoamed and cooled to produce the prepreg.

Examples of the length and position of the notches will hereinafter be described by way of drawings.

Figure 1A:
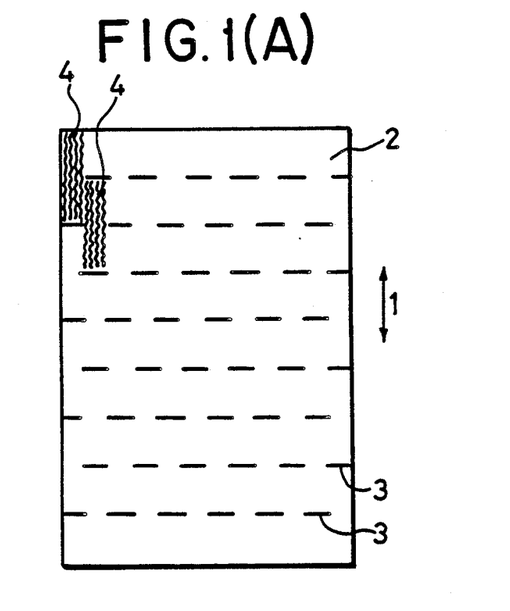
FIGS. 1(A), 1(B) and 1(C) and FIGS. 3(A), 3(B) and 3(C) illustrate various exemplary notch used in the process of this invention.
Figure 1B:
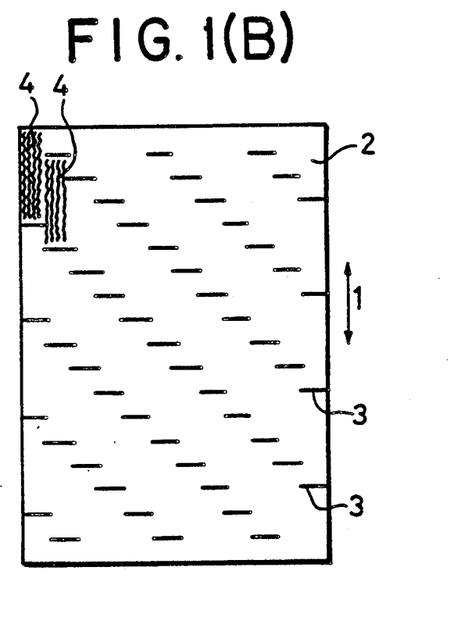
Figure 1C:
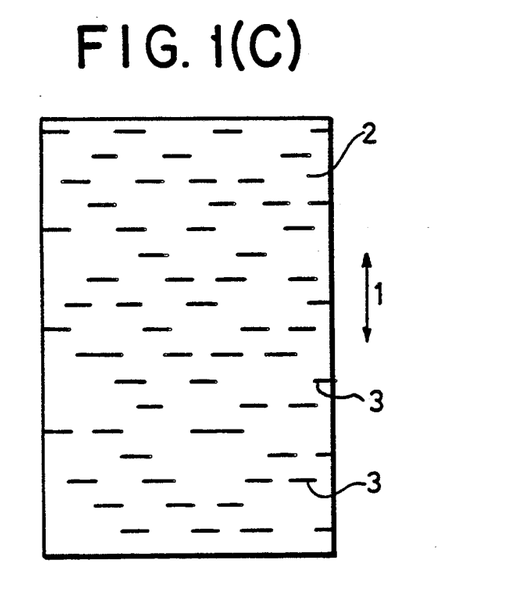

FIGS. 1(A), 1(B) and 1(C) are plan views illustrating exemplary notch patterns on the prepregs of process (1) of the invention.

The direction 1 of the reinforcing fiber in the unidirectionally reinforced sheet prepreg 2 is indicated by an arrow. A large number of the notches 3 are set on the prepreg 2. For example, in FIG. 1(A) and FIG. 1(B), the notch 3 is angularly arranged like a broken line or a staircase. Each length of divided reinforcing fiber constitutes the long side of a uniform rectangular prepreg fragment 4 having a prescribed dimension.

Even though the prepreg was irregularly notched as illustrated in FIG. 1(C), the effects of this invention were observed. The effects can be further enhanced when the following conditions are satisfied.

The conditions are that the notch have a length of from about 2 to about 10 mm and form rows having a notch to notch spacing of from about 2 to about 30 mm in the direction of the notches. The rows are spaced in intervals of from about 5 to about 100 mm. The length and patterns of the notches may be selected in view of the above ranges to be most effective for the filling ability of the prepreg 3 and flowability of the fiber.

To be satisfactory, a notch should have a depth sufficient to completely cut the reinforcing fiber.

Figure 2A:
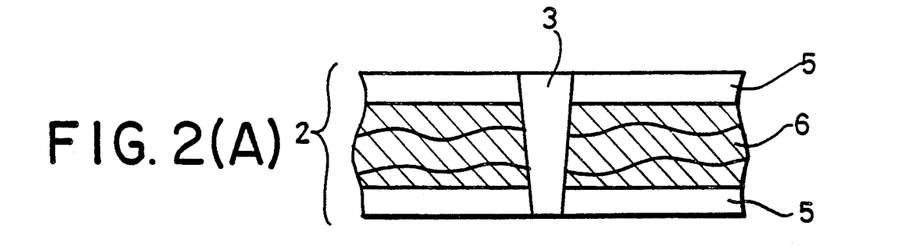
Figure 2B:
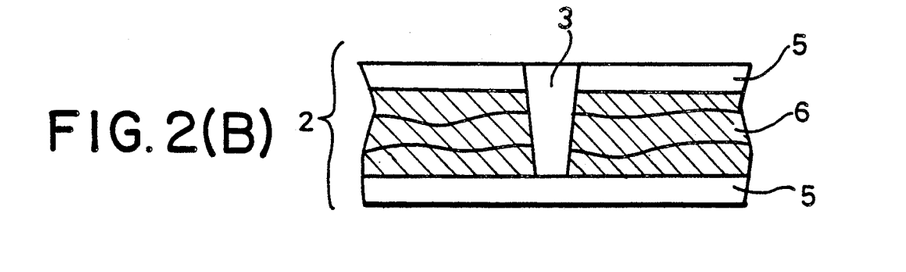

FIG. 2(A) and FIG. 2(B) are sectional views of notched prepregs. The notch 3 which penetrates the prepreg 2 is illustrated in FIG. 2(A) and exhibits the effects of this invention. The notch 3 which does not reach the bottom part 5 of the resin as illustrated in FIG. 2(B) also exhibits the effects of this invention providing that the fiber portion 6 is completely divided.

Practical examples for setting the notch on the prepreg obtained as above in this invention (1) will be described below.

A prepreg can be notched with a sharp edge. When a large amount of treatment is carried out, a so-called blanking-die having cutting-edges built in a wood plate in the form of a notch pattern is mounted on a hydraulic press or a crank press. The prepreg is placed under the mounted blanking-die and punched. Alternatively, the cutting-edges are built in a revolving roller. The roller and a rubber roll are paired and the revolving roller is rotated. The prepreg is then passed between the rubber roller and the bladed roller. The prepreg is continuously notched by this method.

Figure 3A:
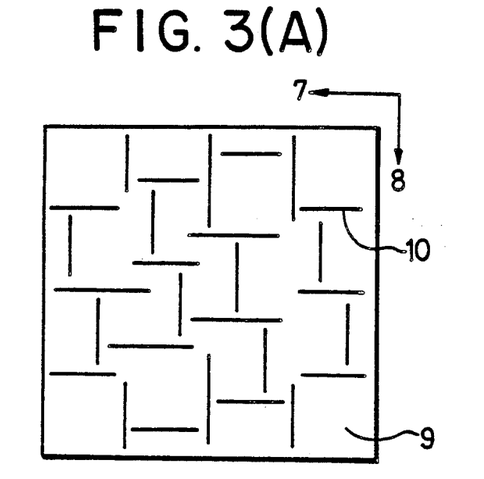
Figure 3B:
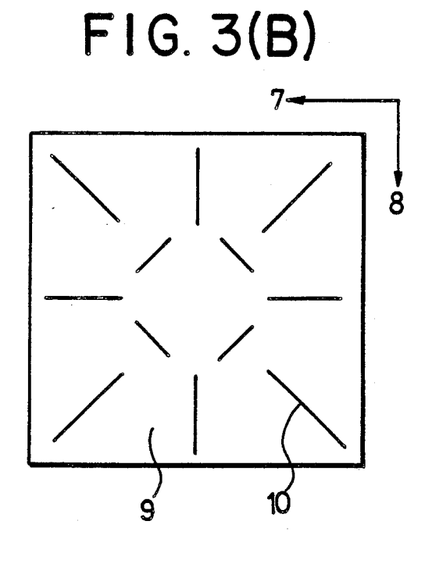
Figure 3C:
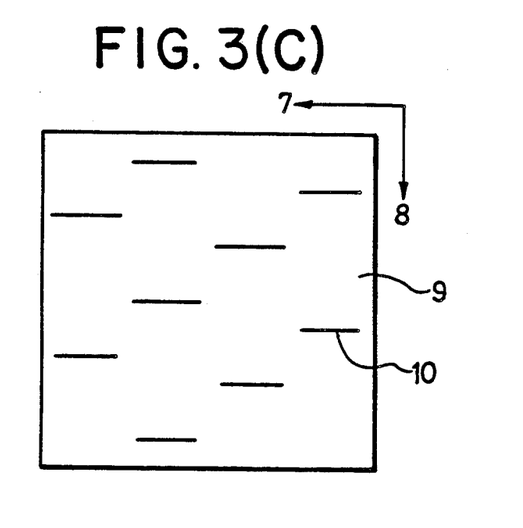

FIGS. 3(A), 3(B) and 3(C) illustrate various notch patterns on the woven textile prepreg of process (2) of the present invention.

FIG. 3(A) illustrates exemplary notches 4 which are set in two directions (in the warp direction 8 of the woven textile and in the weft direction 7), having a depth sufficient to cut the woven textile in the prepreg 9 but not intersecting each other.

FIG. 3(B) illustrates an example of the notches 10 which are set in four directions (in the warp direction 8 of the woven textile, in the weft direction 7 and in the directions making an angle of 45 degrees to the directions of the warp and weft respectively), having a depth sufficient to cut the woven textile of the prepreg 9 but not intersecting each other.

FIG. 3(C) illustrates an example of the notch which is set in the direction of the weft 7 of the woven textile and has a depth sufficient to cut the woven textile.

The prepreg obtained as above in process (2) of the invention may be notched by the following method. For example, fine grooves are engraved on a base plate to fix the blades in the same pattern as that of the notch. A blanking-die having cutting-edges built in the grooves is prepared. The blanking-die is mounted on a crank press or a hydraulic press. The prepreg is placed under the blanking-die and punched. Satisfactory notches have a depth completely cutting the woven textile as described above.

The length and number of the notches employed in the processes of the invention cannot generally be determined because the size of the prepreg is changed according to the molded article desired. Preferably, length of the notch is not more than about half the maximum length of the prepreg and the desired numbers of notches is no greater than about 1100 per square meter of the prepreg.

When the notches length and numbers exceeds the above amounts, the woven textile sometimes tears during the molding process and the effects of this invention cannot be sufficiently exhibited.

The notches must be set to prevent mutual intersection and the portion surrounded by the notch must be protected from dislodgement.

The molding process in the invention (1) be described hereinafter.

On stacking the notched prepreg, the direction of the fiber can be properly selected according to the properties required for the molded article of FRTP. For example, molded articles of FRTP having isotropic strengths in the horizontal direction are prepared by stacking the prepregs in a manner such that the direction of the fiber in each prepreg is respectively shifted, for example, by 45 degrees to disperse the direction. On the other hand, when the strength of the molded article is required for one direction alone, the fiber of the prepreg is arranged in one direction in the stacking process. The laminate of the prepreg thus obtained can be processed to give molded article of FRTP by employing a conventional molding process for use in chopped yarn base FRTP.

For example, when so-called press molding process is applied, the laminate is placed in a mold which is mounted on a press and heated above the flowable temperature of the resin. The laminate is pressed for from about 10 seconds to about 60 minutes under heating at a pressure of from about 1 to 300 kg/cm$^2$. The mold is then cooled to no greater than about the glass transition temperature of the resin and the molded article is released from the mold. Another common molding process which can be used is an autoclave molding process. The laminate is heated in a vacuum above the flowable temperature of the resin, subjected to defoaming and shaping at a pressure of no greater than about 20 kg/cm$^2$, and then cooled to below the glass transition temperature of the resin. Thereafter, the molded article is released from the mold.

A stamp molding process, a high-speed molding process, may be employed. In that process, the laminate is heated in an oven above the flowable temperature of the resin. Then the hot laminate thus obtained or a FRTP plate obtained by the above molding process is placed in a press tool which was previously heated at no greater than about the glass transition temperature of the resin. The press tool is clamped within a short time, and shaping, defoaming and cooling are carried out at the same time.

The process of this invention further includes a process for applying the above laminate or FRTP obtained by the above molding process to a reinforcing material of injection molded products. In the process, the laminate or FRTP is previously inserted ionto a mold and integrated with an injection molding resin.

Irregular flow of the fiber can be inhibited in the molding process (1) of the invention as compared to molding processes of conventional chopped yarn base FRTP wherein many small prepreg fragments obtained by cutting a long fibers containing prepreg are stacked and molded. As a result, warpage, torsion and scattering of the strengths are eliminated from the molded article, which can provide high quality molded articles of FRTP.

Further, as a result of inhibiting the irregular flow of the fiber, interlocking of the fiber is decreased, flowability of the prepreg is improved and short shot of the prepreg is removed.

The molding process (2) of the invention will hereinafter be described.

Desired plies of the notched prepreg are stacked. It is more effective to stack the prepreg so that overlapping of the notches is avoided on each mutually contacting prepreg. For example, each layer is gradually rotates in every direction such as clockwise or counterclockwise by a definite angle in the stacking.

The laminate thus obtained is molded in the next step. So-called stamp molding process, a high-speed molding process, can be used for this invention. The laminate heated in an oven above the flowable temperature of the resin. The hot laminate thus obtained or a FRTP plate obtained by the above molding process is then placed in a press tool which has been previously heated to a temperature above the glass transition temperature of the resin. The press tool is clamped within a short time, and shaping, defoaming and cooling are carried out at the same time.

An autoclave molding process may also be employed under conditions described above.

Notching of the prepreg does not deteriorate the quality of the product particularly the strength of the molded article.

On the other hand, a molded product which is molded without notching and has a curved surface causes an overlapped portion of the woven textile as described above. The portion contains excess fiber almost no resin and hence the portion preferentially damages with loading and the strengths of the molded product becomes much lower than designed strengths.

Consequently, prevention of overlapping of the woven textile itself by notching as described in the invention (2) leads to higher strengths of the molded article and actual strengths approach designed strengths.

The invention will be further clarified by the following examples, which are intended to be purely exemplary of the invention.

EXAMPLES FOR THE USE OF PREPREG CONTAINING UNIDIRECTIONALLY ARRANGED REINFORCING FIBER

The prepreg used in the below described examples 1-6 and comparative examples 1-6 is disclosed in Japanese Patent Laid-Open No. 229535/1986.

A sheet prepreg prepared by bringing a plurality of tension-traveled continuous fiber into contact with a resin film adhered roll was used. Table 1 illustrates the matrix resins and reinforcing fibers used for the prepreg, and the volume content (Vf) of the reinforcing fibers.

EXAMPLE 1

Prepreg a was notched with a pattern illustrated in FIG. 1(A).

The notch had a length of 5 mm, a spacing of 5 mm from notch to notch, an interrow interval of the notch of 12.5 mm and a depth sufficient to completely cut the fiber in the prepreg.

The notch was set by mounting on a hydraulic press a blanking-die having cutting-edges in the above dimensions and in the pattern set forth in FIG. 1(A) and by carrying out punching.

In the next step, 8 plies of notched prepreg were stacked to form a laminte.

The direction of the fiber in the first ply of the prepreg was defined as 0°. The directions of the fibers in the stacking plies were each shifted by 45° in the sequence 45°, 90°, 135°, 135°, 90°, 45°, and 0°. The thickness of the laminate was 1.6 mm.

The laminate was cut into rectangular forms of 200 mm×100 mm so that the direction 0° corresponded to the long side.

The rectangular laminate was placed in the center of a mold for shaping a plate, having dimensions of 250 mm×150 mm×1 mm. A FRTP plate was prepared under the molding conditions illustrated in Table 2.

The long-side direction of the FRTP plate was defined as 0°. Bending properties of the plate were measured in the directions of 0°, 45° and 90°. Properties were measured under the conditions; specimen length 80 mm, specimen width 15 mm, span distance 50 mm and loading rate 1 mm/min.

The flowability of the prepreg in the molding was evaluated after molding by inspecting whether the prepreg was completely filled in the mold.

Table 2 illustrates the bending properties and the results of flowability evaluation.

EXAMPLE 2

A plate was prepared by carrying out the same procedures as described in Example 1 except that prepreg b was used.

The strength and flowability evaluations of the plate are illustrated in Table 2.

EXAMPLE 3

Prepreg c was notched with a pattern illustrated in FIG. 1(B).

The notch had a length of 5 mm, an internotch spacing of 15 mm which was three times the length of the notch, an interrow interval of the notch of 8 mm and a depth sufficient to completely cut the fiber of the prepreg.

The notch was set by mounting on a hydraulic press a blanking-die having cutting-edges in the above dimensions and in the pattern of FIG. 1(B), and by carrying out punching.

A laminate was prepared from the notched prepreg by the same procedures as described in Example 1. A plate having dimensions of 250 mm×150 mm×1 mm was prepared by molding the laminate under the conditions illustrated in Table 2 and according to the procedures described in Example 1. Bending properties of the plate and flowability of the prepreg were evaluated by the same procedures as described in Example 1. The results are illustrated in Table 2.

EXAMPLE 4

A plate was prepared by carrying out the same procedures as described in Example 3 except that prepreg d was used.

The results on the evaluation of strengths of the plate and flowability of the prepreg are illustrated in Table 2.

EXAMPLE 5

The notch was set on the prepreg e with a pattern illustrated in FIG. 1(C).

The notch had a length of 5 mm, an arbitrary notch to notch spacing of 5×n mm (n=1, 2 and 3), an arbitrary interrow interval of the notch ranging from 5 to 8 mm and a depth sufficient to completely cut the fiber of the prepreg.

The notch was set by mounting on a hydraulic press a blanking-die having cutting-edges in the above dimensions and in the pattern of FIG. 1(C), and by carrying out punching.

A laminate was prepared from the notch prepreg by the same procedures as described in Example 1. A plate having dimensions of 250 mm×150 mm×1 mm was prepared by molding the laminate under the conditions illustrated in Table 2 by carrying out the same procedures as described in Example 1. Bending properties of the plate and flowability of the prepreg were evaluated by the same procedures as described in Example 1. The results are illustrated in Table 2.

EXAMPLE 6

A molded plate was prepared by carrying out the same procedures as described in Example 5 except that molding conditions illustrated in Table 2 were used. Bending properties of the plate and flowability of the prepreg were evaluated and the results are illustrated in Table 2.

Almost no scattering was found on the bending properties in Examples 1-6. Flowability was also good.

COMPARATIVE EXAMPLES 1-6

The same prepregs a to f as used in Examples 1-6 were cut into rectangular forms where the direction of the fiber takes a long side, the length is 25 mm and the width is 5 mm.

The same weight of the rectangular prepreg as that of the laminate in Examples 1-6 was stacked in the center of the mold used in Examples 1-6 so as to obtain the same area as in Examples 1-6. Plates having dimensions of 250 mm×150 mm×1 mm were molded under the conditions illustrated in Table 3.

As described in Examples 1-6, the bending properties of these plates and flowability of the prepregs were evaluated by the same procedures as described in Example 1. The results are illustrated in Table 3.

Comparative Examples 1-6 have larger scattering of strengths in the directions of 0°, 45° and 90° as compared to Examples 1-6. Short shot was taken place in Comparative Example 5.

TABLE 1

| Prepreg | Matrix resin | Reinforcing fiber | $V_f$ (vol. %) |
|---|---|---|---|
| a | Polycarbonate | Glass yarn (Unitica, G150 1/0 1Z) | 40 |
| b | Polycarbonate | Carbon yarn (Toray, TORECA T 300-3000-40A) | 40 |
| c | Polyetheretherketone | Glass yarn (Unitica, G150 1/0 1Z) | 40 |
| d | Polyetheretherketone | Carbon yarn (Toray, TORECA T 300-3000-40A) | 40 |
| e | Polyetheretherketone | Carbon yarn (Toray, TORECA T 300-3000-40A) | 60 |
| f | Nylon-6 | Carbon yarn (Toray, TORECA T 300-3000-40A) | 40 |

TABLE 2

| Example No. | 1 | 2 | 3 | 4 | 5 | 6 |
|---|---|---|---|---|---|---|
| Prepreg | a | b | c | d | e | f |
| Notch pattern | A | A | B | B | C | C |
| Molding condition | | | | | | |
| Molding temperature (°C.) | 270 | 270 | 380 | 380 | 380 | 270 |
| Molding pressure (kg/cm$^2$) | 70 | 70 | 70 | 70 | 100 | 70 |
| Pressing time (min) | 10 | 10 | 10 | 10 | 10 | 10 |
| Cooling rate (°C./min) | 15-17 | 15-17 | 15-17 | 15-17 | 15-17 | 15-17 |
| Mold release temperature (°C.) | 50 | 50 | 50 | 50 | 50 | 50 |
| Bending strength | | | | | | |
| 0° (kg/mm$^2$) | 35 | 45 | 38 | 48 | 53 | 37 |
| 45° (kg/mm$^2$) | 34 | 44 | 37 | 49 | 55 | 35 |
| 90° (kg/mm$^2$) | 35 | 43 | 38 | 50 | 52 | 36 |
| Bending modulus | | | | | | |
| 0° (kg/mm$^2$) | 1600 | 1600 | 1700 | 2700 | 3000 | 2400 |
| 45° (kg/mm$^2$) | 1600 | 1600 | 1700 | 2700 | 3000 | 2400 |
| 90° (kg/mm$^2$) | 1600 | 1600 | 1700 | 2700 | 3000 | 2400 |
| Flowability (*) | | | | | | |

Note: (*)
Completely filled into the mold

TABLE 3

| Comparative Example No. | 1 | 2 | 3 | 4 | 5 | 6 |
|---|---|---|---|---|---|---|
| Prepreg | a | b | c | d | e | f |
| Molding condition | | | | | | |
| Molding temperature (°C.) | 270 | 270 | 380 | 380 | 380 | 270 |
| Molding pressure (kg/cm$^2$) | 70 | 70 | 70 | 70 | 100 | 70 |
| Pressing time (min) | 10 | 10 | 10 | 10 | 10 | 10 |
| Cooling rate (°C./min) | 15-17 | 15-17 | 15-17 | 15-17 | 15-17 | 15-17 |
| Mold release temperature (°C.) | 50 | 50 | 50 | 50 | 50 | 50 |
| Bending strength | | | | | | |
| 0° (kg/mm$^2$) | 28 | 41 | 33 | 46 | 40 | 38 |
| 45° (kg/mm$^2$) | 20 | 37 | 30 | 40 | 32 | 31 |
| 90° (kg/mm$^2$) | 24 | 30 | 28 | 38 | 30 | 35 |
| Bending modulus | | | | | | |
| 0° (kg/mm$^2$) | 1000 | 2200 | 1100 | 2300 | 2400 | 2000 |
| 45° (kg/mm$^2$) | 950 | 2100 | 1100 | 2200 | 2200 | 1900 |
| 90° (kg/mm$^2$) | 1000 | 2000 | 1000 | 2100 | 2200 | 2000 |
| Flowability (*) | | | | | x | |

Note: (*)
Completely filled into the mold, x: Short sot

EXAMPLES FOR USING WOVEN TEXTILE REINFORCED PREPREG

Molding process of the prepregs used in Examples 7-9 and Comparative Examples 7-9 will be illustrated.

PREPARATION OF GLASS CLOTH

Glass monofilaments having a size of 9 μm were spun by using starch glue as a bundling agent. A yarn having a tex of 67.5 was prepared.

The yarn was weaved into a plain cloth having a warp density of 42 threads per 25 mm width and a weft density of 32 threads per 25 mm width.

The cloth was subjected to heat cleaning at 400° C. for 10 hours, thereafter passed through a 0.3% by weight aqueous solution of γ-aminopropyl-trimethoxysilane and successively dried at a temperature of 100°-110° C. for 10 minutes to give the treated glass cloth.

PREPARATION OF CARBON CLOTH

Carbon cloth (Toray, #6343) was washed by dipping into acetone, allowed to dry in air and further dried at a temperature of 100° C. for 10 minutes to give treated carbon cloth.

PREPARATION OF PREPREG

Prepreg was prepared in accordance with the process disclosed in Japanese Patent Laid-Open No. 229534/1986. The upper and bottom belts were driven by the rotation of hot rolls. The resin was fused on the belt by the heat of hot rolls. The woven textile was passed through the fused resin. Impregnation and defoaming was carried out by driving the belts to prepare prepreg containing the woven textile as a reinforcing agent.

Table 4 illustrates name of prepregs, resins used, sorts of reinforcing fiber and volume content (Vf) of the prepregs.

EXAMPLE 7

Prepreg g was cut into squares having a side of 300 mm.

A blanking-die having an edge-pattern shown in FIG. 3(A) was mounted on a hydraulic press. The notch was prepared by punching the square-cut prepreg to the depth sufficient to cut the woven textile in the prepreg.

The pattern of the notch was set in two directions (in the direction of warp 8 of the woven textile and in the direction of weft 7) and had a notch length of 45 mm, 50 mm and 60 mm.

Ten plies of the notched prepreg were stacked in a counterclockwise shift by an angle of 45° in each prepreg.

The laminate thus obtained was preheated at 270° C. for 5 minutes in a hot-air circulating type drying oven.

Figure 4:
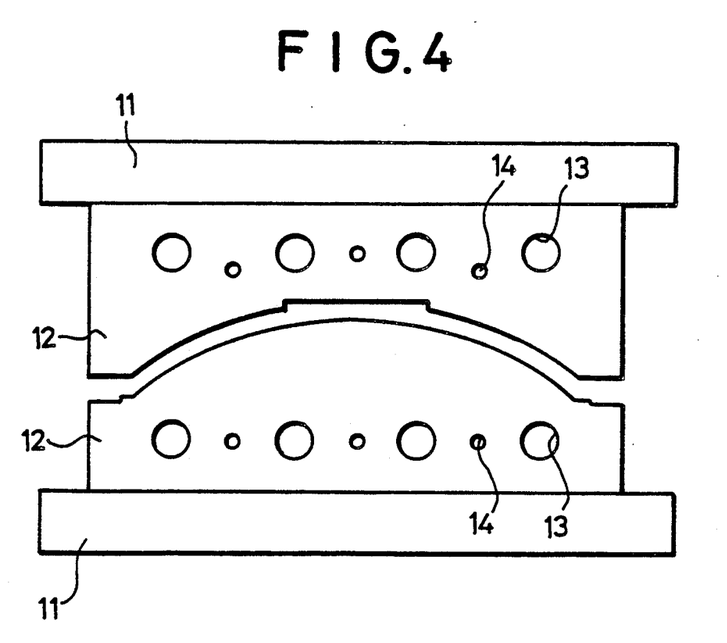
FIG. 4 illustrates a mold for stamp molding used in examples 7-9 and comparative examples 7-9.

A metal mold having a mold holder 11, mold bodys 12 one of which has a 180R sphere-cavity the depth of wich is 38 mm, other of which has a 178R swell corresponding said cavity, mold heater 13 and mold temperature measuring hole 14 as illustrated in FIG. 4 was used for the stamp molding of a hemiballoon article.

The mold was heated to 120° C. and the above laminate which was preheated at 270° C. and placed into the mold. The mold was clamped within 10 seconds, dwelled for a minute with 40 tons of pressure loading and then the mold was opened to remove a molded article having a wall thickness of 1 mm.

The molded article had no overlap of the woven textile and also had good appearance.

EXAMPLE 8

Prepreg h was cut into squares having a side of 300 mm.

A blanking-die having an edge-pattern shown in FIG. 3(B) was mounted on a hydraulic press. The notch was prepared by punching the square-cut prepreg to the depth sufficient to cut the woven textile in the prepreg.

The pattern of the notch was set in four directions (in the direction of warp 8 of the woven textile, in the direction of weft 7 and in two directions making an angle of 45° to the directions of the warp and weft respectively) and had a notch length of 40 mm, 65 mm and 100 mm.

Ten plies of the notched prepreg were stacked in a counterclockwise shift by an angle of 120° in each prepreg.

The laminate thus obtained was preheated at 270° C. for 5 minutes in a hot-air circulating type drying oven.

The preheated laminate was subjected to stamp molding by the same procedures as described in Example 7 to obtain a hemiballoon molded article having a wall thickness of 1 mm.

The molded article had no overlap of the woven textile and also had good appearance.

EXAMPLE 9

Prepreg i was cut into squares having a side of 300 mm.

A blanking-die having an edge-pattern shown in FIG. 3(C) was mounted on a hydraulic press. The notch was prepared by punching the square-cut prepreg to the depth sufficient to cut the woven textile in the prepreg.

The pattern of the notch was set in the direction of warp 7 and had a notch length of 62.5 mm.

Ten plies of the notched prepreg were stacked in a counterclockwise shift by an angle of 90° in each prepreg.

The laminate thus obtained was preheated at 380° C. for 5 minutes in a hot-air circulating type drying oven.

A mold for use in stamp molding of a hemiballoon article as illustrated in FIG. 4 was heated to 200° C.

The preheated laminate of the prepreg obtained above was placed the mold. The mold was clamped within 10 minutes, dwelled for a minute with 60 tons of pressure loading and then the mold was opened to remove a molded article having a wall thickness of 1 mm.

The mold article had no overlap of the woven textile and also had good appearance.

COMPARATIVE EXAMPLE 7

A molded article was obtained by carrying out the same procedures as described in Example 7 except that no notch was applied to the prepreg.

Overlap of the woven textile having a length of 10 cm and a width of 5-10 mm was found in two portions of the molded article. Almost no resin was found in these portions and the glass fiber caused whitening. Consequently, the molded article was a defective unit.

COMPARATIVE EXAMPLE 8

A molded article was obtained by carrying out the same procedures as described in Example 8 except that no notch was applied to the prepreg.

Overlap of the woven textile having a length of 10 cm and a width of 5-10 mm was found in two portions of the molded article. Almost no resin was found in these portions and the carbon fiber was separated by rubbing with a cloth. Consequently, the molded article was a defective unit.

COMPARATIVE EXAMPLE 9

A molded article was obtained by carrying out the same procedures as described in Example 9 except that no notch was applied to the prepreg.

Overlap of the woven textile having a length of 7 cm and a width of 5-10 mm was found in two portions of the molded article. Almost no resin was found in these portions and the glass fiber caused whitening. Consequently, the molded article was a defective unit.

TABLE 4

| Prepreg | Matrix resin | Reinforcing fiber | $V_f$ (vol. %) |
| --- | --- | --- | --- |
| g | Polycarbonate | Glass cloth | 55 |
| h | Nylon-6 | Carbon cloth | 60 |
| i | Polyetherether | Glass cloth | 55 |

TABLE 4-continued

| Prepreg | Matrix resin | Reinforcing fiber | $V_f$ (vol. %) |
|---------|--------------|-------------------|----------------|
|         | ketone       |                   |                |

What is claimed is:

1. A process for preparing a fiber-reinforced thermoplastic article comprising applying to each of a plurality of sheet prepregs each comprising unidirectionally arranged reinforcing fibers impregnated with a thermoplastic resin, at least one notch in a direction traversing said reinforcing fibers at a depth sufficient to cut said reinforcing fibers, wherein said prepreg contains at least two notches having lengths of from about 2 mm to about 10 mm forming rows having a notch to notch spacing of from about 2 mm to about 30 mm in the direction of said notches and said rows being spaced from each other a distance of from about 5 mm to about 100 mm, and stacking said sheet prepregs and molding said prepregs to form a fiber-reinforced thermoplastic article.

2. The process of claim 1 wherein said thermoplastic resin is selected from the group consisting of polystyrenes, polypropylenes, polyethylenes, AS resins, ABS resins, polyacrylonitrile-polystyrene-polyacrylate resins, polymethyl methacrylates, nylons, polyacetals, polycarbonates, polyethylene terephthalates, polybutylene terephthalates, polyphenylene oxides, fluoro resins, polyphenylene sulfides, polysulfones, polyether, sulfones, polyether ketones, polyether ether ketones, polyimides and polyacrylates.

3. The process of claim 1 wherein said reinforcing fiber is selected from the group consisting of glass fibers, carbon fibers, aramid fibers and silicon carbide fibers.

4. The process of claim 1 wherein said reinforcing fiber is selected from the group consisting of glass yarn and carbon yarn.

5. The process of claim 1 wherein said prepregs contain no greater than about 1100 notches per square meter of prepreg.

6. The process of claim 1 wherein said at least one notch has a length no greater than about one-half the maximum length of each prepreg.

7. The process of claim 1 wherein a laminate of said prepreg is subjected to a molding process selected from the group consisting of press molding, autoclave molding and stamp molding processes.

8. The process of claim 7 wherein a laminate of said prepreg is subjected to stamp molding.

9. A process for preparing a fiber-reinforced thermoplastic article comprising applying to each of a plurality of sheet prepregs each comprising woven reinforcing fibers impregnated with a thermoplastic resin, at least one notch having a depth sufficient to cut said reinforcing fibers in said prepreg but not intersecting each other, wherein said prepregs contain no greater than about 1100 notches per square meter of prepreg and said notches have a length no greater than about one-half the maximum length of said prepreg, and stacking said sheet prepregs and molding said prepregs to form a fiber-reinforced thermoplastic article.

10. The process of claim 9 wherein said thermoplastic resin is selected from the group consisting of polystyrenes, polypropylenes, polyethylenes, AS resins, ABS resins, polyacrylonitrile-polystyrene-polyacrylate resins, polymethyl methacrylates, nylons, polyacetals, polycarbonates, polyethylene terephthalates, polyphenylene oxides, fluoro resins, polyphenylene sulfides, polysulfones, polyether sulfones, polyether ketones, polyether ether ketones, polyimides and polyacrylates.

11. The process of claim 9 wherein said woven reinforcing fiber is selected from the group consisting of glass fibers, carbon fibers, aramid fibers and silicon carbide fibers.

12. The process of claim 9 wherein said woven reinforcing fiber is a woven textile selected from the group consisting of plain weave, satin weave and diagonal weave.

13. The process of claim 9 wherein said woven reinforcing fiber is selected from the group consisting of glass cloth and carbon cloth.

* * * * *

UNITED STATES PATENT AND TRADEMARK OFFICE
CERTIFICATE OF CORRECTION

PATENT NO. : 4,990,207
DATED : February 5, 1991
INVENTOR(S) : Sakai et al.

It is certified that error appears in the above-identified patent and that said Letters Patent is hereby corrected as shown below:

On the title page, delete the following:

"[30]    Foreign Application Priority Data

Oct. 13, 1988 [JP]   Japan..................... 62-79715
   Nov.  4, 1988 [JP]   Japan.....................62-101805"

Signed and Sealed this

Twentieth Day of October, 1992

Attest:

DOUGLAS B. COMER

*Attesting Officer*    *Acting Commissioner of Patents and Trademarks*